US008867632B2

(12) United States Patent
Yokomakura et al.

(10) Patent No.: US 8,867,632 B2
(45) Date of Patent: Oct. 21, 2014

(54) WIRELESS COMMUNICATION SYSTEM, COMMUNICATION DEVICE, COMMUNICATION METHOD, AND PROGRAM

(75) Inventors: Kazunari Yokomakura, Osaka (JP); Yasuhiro Hamaguchi, Osaka (JP); Osamu Nakamura, Osaka (JP); Jungo Goto, Osaka (JP); Hiroki Takahashi, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 105 days.

(21) Appl. No.: 13/508,749

(22) PCT Filed: Nov. 1, 2010

(86) PCT No.: PCT/JP2010/069402
§ 371 (c)(1),
(2), (4) Date: May 9, 2012

(87) PCT Pub. No.: WO2011/058896
PCT Pub. Date: May 19, 2011

(65) Prior Publication Data
US 2012/0230376 A1 Sep. 13, 2012

(30) Foreign Application Priority Data
Nov. 10, 2009 (JP) ................... 2009-256926

(51) Int. Cl.
*H04L 27/00* (2006.01)
*H04W 52/18* (2009.01)
*H04W 52/36* (2009.01)
*H04L 25/03* (2006.01)

(52) U.S. Cl.
CPC ......... *H04L 25/03828* (2013.01); *H04W 52/18* (2013.01); *H04W 52/36* (2013.01)
USPC ............................ 375/259; 375/285; 370/328

(58) Field of Classification Search
USPC .................................. 375/219, 285; 370/328
See application file for complete search history.

(56) References Cited

U.S. PATENT DOCUMENTS 5,249,200 A * 9/1993 Chen et al. .................... 375/285
2001/0024427 A1 9/2001 Suzuki
(Continued)

FOREIGN PATENT DOCUMENTS

CN 101057471 A 10/2007
JP 2001-238269 A 8/2001
(Continued)

OTHER PUBLICATIONS

Okada et al., "A Proposal on Spectrum Shaping exploiting Frequency Clipping for Turbo Equalization", The Institute of Electronics, Information and Communication Engineers, Technical Report of IEICE, pp. 1-4, Mar. 2007.
Chinese Office Action for Application No. 201080050690.1 issued May 6, 2014.

*Primary Examiner* — Eva Puente
(74) *Attorney, Agent, or Firm* — Birch, Stewart, Kolasch & Birch, LLP

(57) ABSTRACT

Provided is a wireless communication system including a first communication device configured to perform spectral shaping on a frequency signal and transmit the signal, and a second communication device configured to receive the signal transmitted by the first communication device, and the second communication device includes: a frequency averaging unit configured to dividing information on transmission power gains in all the discrete frequencies into blocks by a plurality of discrete frequencies, information being necessary for the first communication device to perform the spectral shaping; a quantizing unit configured to quantize representative values of the blocks; and a transmitting unit configured to transmit the quantized signals.

12 Claims, 8 Drawing Sheets

(56) References Cited

U.S. PATENT DOCUMENTS

| | | |
|---|---|---|
| 2003/0085825 A1* | 5/2003 | Jensen et al. .................. 341/143 |
| 2005/0053036 A1 | 3/2005 | Takeda |
| 2006/0093065 A1 | 5/2006 | Thomas et al. |
| 2008/0056181 A1 | 3/2008 | Imamura et al. |
| 2010/0104041 A1* | 4/2010 | Ibi et al. ........................ 375/285 |
| 2012/0008563 A1* | 1/2012 | Johansson et al. ............ 370/328 |

FOREIGN PATENT DOCUMENTS

| | | |
|---|---|---|
| JP | 2003-152671 A | 5/2003 |
| JP | 2005-45504 A | 2/2005 |
| JP | 2008-519565 A | 6/2008 |
| JP | 2008-288812 A | 11/2008 |
| WO | WO 2006/030867 A1 | 3/2006 |
| WO | WO 2006/052501 A1 | 5/2006 |

\* cited by examiner

Fig. 4
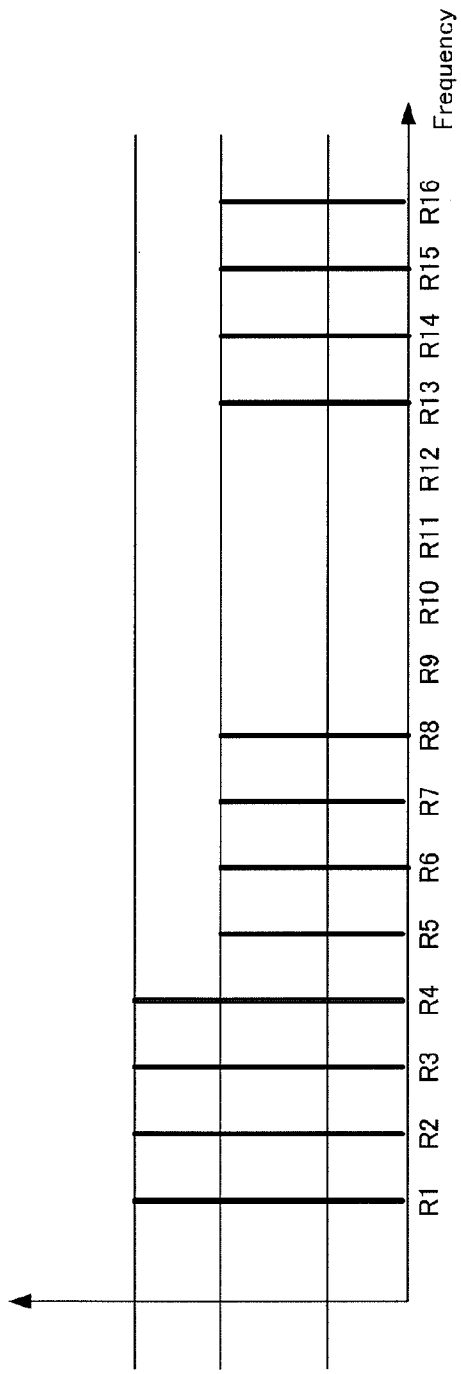
(a) Transmission power to be allocated
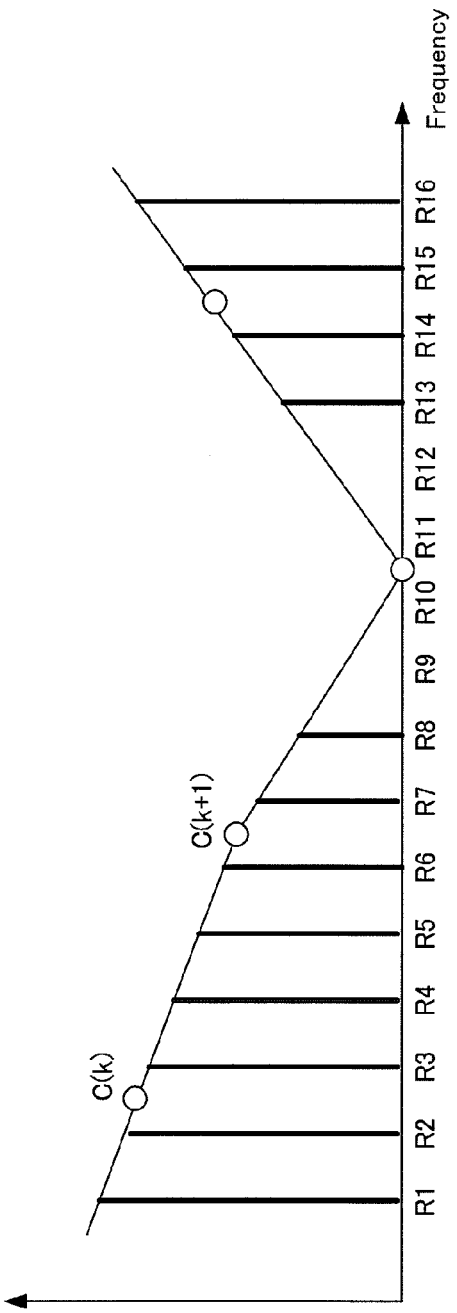
(b) Transmission power to be allocated Fig. 8    PRIOR ART
(a) Signal-to-noise power ratio
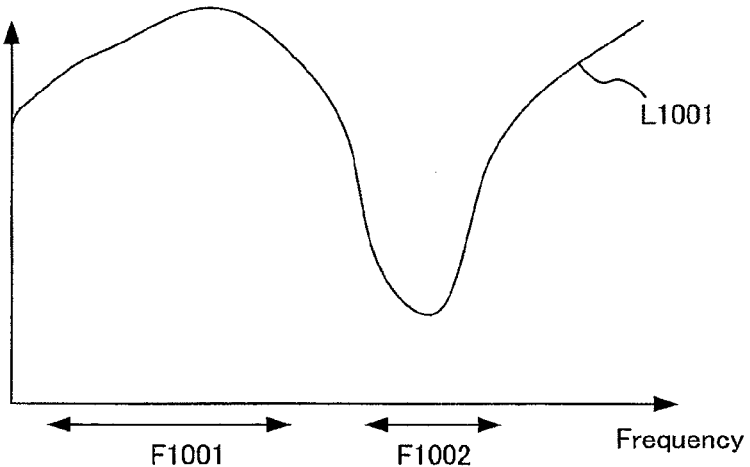
(b) Transmission power
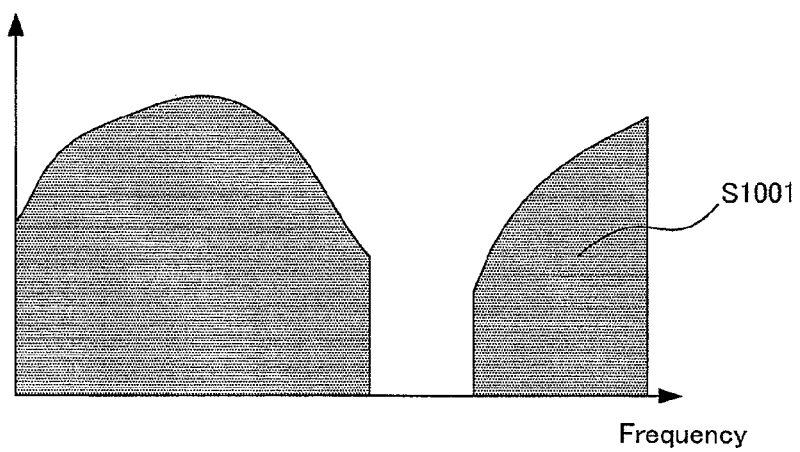

WIRELESS COMMUNICATION SYSTEM, COMMUNICATION DEVICE, COMMUNICATION METHOD, AND PROGRAM

TECHNICAL FIELD

The present invention relates to a wireless communication technique.

BACKGROUND ART

Currently, the standardization of the LTE (Long Term Evolution) system, which is a wireless communication system for mobile phones of the 3.9th generation, is almost completed. Recently, LTE-A (LTE-Advanced), which is a fourth-generation wireless communication system being a more advanced version of the LTE system, has started to be standardized.

In general, for an uplink of a mobile communication system (communication from mobile stations to a base station), mobile stations serve as transmitting stations, and thus a single-carrier method (LET employs SC-FDMA (Single Carrier Frequency Division Multiple Access)) is considered effective due to its low peak power that enables the power use efficiency of an amplifier to be maintained at a high level with a limited transmission power. Note that SC-FDMA is also called DFT-S-OFDM (Discrete Fourier Transform Spread Orthogonal Frequency Division Multiplexing).

A single-carrier method such as SC-FDMA assumes a continuous spectrum arrangement. Thus, under an environment where frequency selective fading occurs due to a delay of an electric wave in a radio propagation path, part of the spectrum has low gain of the propagation path and therefore makes the received power significantly low. The energy loss remains as it is even when an adaptive equalization technique (such as frequency domain equalization) is used.

In this respect, Non-patent Document 1 listed below has disclosed a technique of performing spectral shaping based on a water filling theorem (also called WF) which can maximize the received energy.

FIG. 8 is a diagram showing the principle described in Non-patent Document 1. In the upper part of FIG. 8, the horizontal axis is frequency while the vertical axis is signal-to-noise power ratio (SNR). L1001 in Part (a) of FIG. 8 represents the propagation path gain at each frequency estimated in an uplink. In addition, in Part (b) of FIG. 8, the horizontal axis represents frequency while the vertical axis represents the transmission power at each frequency. The horizontal axes in Parts (a) and (b) of FIG. 8 are matched with each other. Under such a frequency selective fading environment, there are frequencies with high propagation path gains such as ones in a band F1001, while there are frequencies with extremely low gains such as ones in F1002. Thus, as shown by S1001 in Part (b) of FIG. 8, in the single-carrier spectrum, higher transmission powers are allocated to the band F1001 while lower transmission powers are allocated to frequencies with lower gains. Further, the received energy is maximized with the same amount of transmission power by a clipping process which allocates no power to frequencies with extremely low gains such as ones in F1002.

To utilize the received energy thus maximized, the receiving side makes detection through turbo equalization in which the transmission energy allocated based on the water filling theorem is regarded as the frequency gains. Thus, the receiving side can perform accurate detection.

PRIOR ART DOCUMENT

Non-Patent Document

NON-PATENT DOCUMENT 1: Okada et al., "A Proposal on Spectrum Shaping exploiting Frequency Clipping for Turbo Equalization", Technical Report of the Institute of Electronics, Information, and Communication Engineers (IEICE Technical Report), RCS2006-259, March, 2007.

SUMMARY OF THE INVENTION

Problem to be Solved by the Invention

However, the method described above needs to notify a mobile station, which serves as a transmitting device, of the amount of power to be allocated to each frequency and has a problem that the amount of control information therefor may become large.

The present invention has been made in view of such a circumstance, and an object thereof is to notify a mobile station, which serves as a transmitting device, of the amount of power to be allocated to each frequency with a small amount of control information in a wireless communication system configured to perform spectral shaping on a single carrier.

A first aspect of the present invention is a wireless communication system including a first communication device configured to perform spectral shaping on a frequency signal and transmit the signal, and a second communication device configured to receive the signal transmitted by the first communication device, characterized in that the second communication device includes a frequency averaging unit configured to divide information on transmission power gains in all the discrete frequencies into blocks by a plurality of discrete frequencies, information being necessary for the first communication device to perform the spectral shaping, a quantizing unit configured to quantize representative values of the blocks, and a transmitting unit configured to transmit the quantized signals. Each of the first communication device and the second communication device preferably further calculates gains of transmission powers to be allocated to the discrete frequencies by using at least one of interpolation and extrapolation. In addition, in a source coding process of the quantized gains of the transmission powers, the second communication device preferably assigns a smaller number of information bits to a level with a higher probability while assigning a larger number of information bits to a level with a lower probability. The source coding process preferably assigns a small number of information bits to a clipped frequency.

In addition, the present invention is a wireless communication system including a first communication device configured to perform spectral shaping on a frequency signal and transmit the signal, and a second communication device configured to receive the signal transmitted by the first communication device, characterized in that the second communication device notifies the first communication device of only information on a clipped frequency among information on gains of transmission powers to be allocated necessary for the first communication device to perform the spectral shaping.

Moreover, the present invention is a second communication device in a wireless communication system including a first communication device configured to perform spectral shaping on a frequency signal and transmit the signal, and the second communication device configured to receive the signal transmitted by the first communication device, characterized in that the second communication device comprises a frequency averaging unit configured to divide information on transmission power gains in all the discrete frequencies to be allocated into blocks by a plurality of discrete frequencies, information being necessary for the first communication device to perform the spectral shaping, a quantizing unit configured to quantize representative values of the blocks, and a transmitting unit configured to transmit the quantized signals. Each of the first communication device and the second communication device preferably further calculates gains of transmission powers to be allocated to the discrete frequencies by using at least one of interpolation and extrapolation. In a source coding process of the quantized gains of the transmission powers, the second communication device preferably assigns a smaller number of information bits to a level with a higher probability while assigning a larger number of information bits to a level with a lower probability. The source coding process preferably assigns a small number of information bits to a clipped frequency.

The present invention is a second communication device in a wireless communication system including a first communication device configured to perform spectral shaping on a frequency signal and transmit the signal, and the second communication device configured to receive the signal transmitted by the first communication device, characterized in that the second communication device notifies the first communication device of only information on a clipped frequency among information on gains of transmission powers to be allocated necessary for the first communication device to perform the spectral shaping.

Furthermore, the present invention is a communication method of a second communication device in a wireless communication system including a first communication device configured to perform spectral shaping on a frequency signal and transmit the signal, and the second communication device configured to receive the signal transmitted by the first communication device, characterized in that the communication method comprises: a frequency averaging step of dividing information on transmission power gains in all the discrete frequencies to be allocated into blocks by a plurality of discrete frequencies, information being necessary for the first communication device to perform the spectral shaping; a quantizing step of quantizing representative values of the blocks; and a transmitting step of transmitting the quantized signals to the first communication device.

The present invention may be a program for executing the communication method described above and may also be a computer-readable recording medium in which the program is recorded. The program may be one which can be obtained through a transmission medium such as the Internet.

The present description encompasses the contents described in the description and/or drawings of Japanese Patent Application No. 2009-256926 based on which the present application claims priority.

Effect of the Invention

The present invention makes it possible to perform spectral shaping with a small amount of control information and thereby increase the transmission efficiency.

BRIEF DESCRIPTION OF THE DRAWINGS

FIG. 4 is a diagram showing one example of a concept that quantized gains in transmission power allocation are regenerated by using supplement through interpolation or extrapolation in the frequency direction, and then spectral shaping is performed.

FIG. 8 is a diagram showing the principle of a technique described in Non-patent Document 1 in which spectral shaping based on a water filling theorem is performed.

Figure 1:
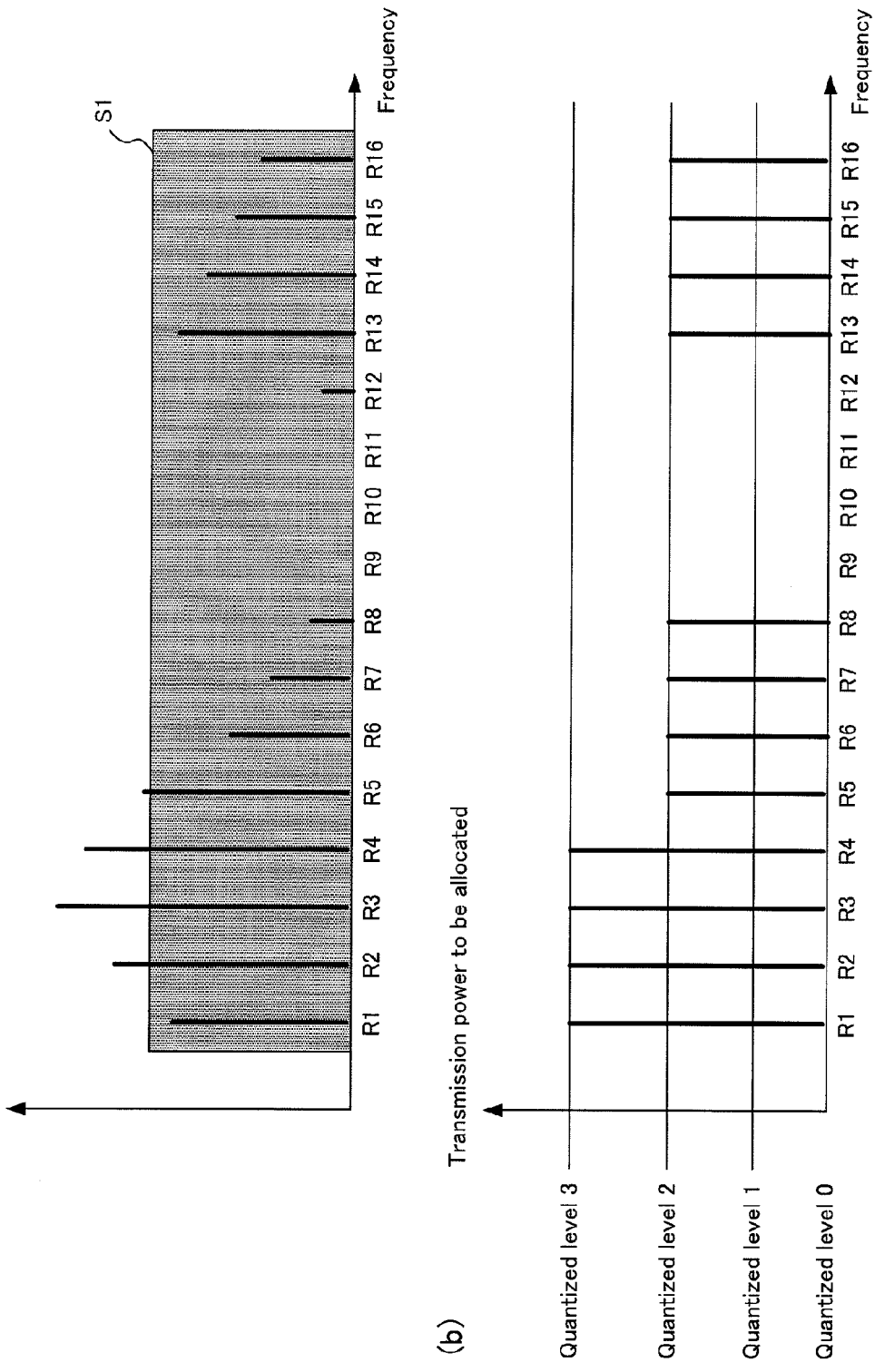
FIG. 1 is a diagram for describing the concept of a first embodiment of the present invention.

EXPLANATION OF THE REFERENCE NUMERALS 1 receiving antenna
2 receiving unit
3 spectral shaping information detecting unit
4 coding unit
5 modulating unit
6 DFT unit
7 spectral shaping unit
8 IDFT (Inverse DFT) unit
9 reference signal generating unit
10 reference signal multiplexing unit
11 CP (Cyclic Prefix) inserting unit
12 D/A (Digital to Analog) unit
13 radio unit
14 transmitting antenna
21 receiving antenna
22 radio unit
23 A/D (Analog to Digital) unit
24 CP removing unit
25 reference signal separating unit
26 propagation path estimating unit
27 spectral shaping information generating unit
28 frequency averaging unit
29 quantizing unit
30 transmitting unit
31 transmitting antenna
32 buffer
33 equivalent propagation path calculating unit
34 soft cancelling unit
35 equalizing unit
36 demodulating unit
37 decoding unit
38 soft replica generating unit

MODES FOR CARRYING OUT THE INVENTION

Hereinbelow, modes for carrying out the invention will be described with reference to the drawings. Note that although the following embodiments will be described on the assumption that spectral shaping is performed for SC-FDMA, the present invention is not limited to this case. For example, the present invention is applicable also to clustered DFT-S-OFDM (also called Dynamic Spectrum Control (DSC) and the like) in which the spectrum of an SC-FDMA signal is divided into multiple clusters in a dispersed arrangement, and the like.

First Embodiment

FIG. 1 is a diagram for describing the concept of a first embodiment of the present invention. The description will be given by assuming that the number of discrete spectra of the SC-FDMA signal is 16. In Part (a) of FIG. 1, R1 to R16 on the horizontal axis represent discrete frequency (subcarrier) indices while the vertical axis represents transmission power to be allocated. This is the method of Non-patent Document 1, and the amount of power to be allocated to each discrete frequency is set based on the water filling theorem.

On the other hand, Part (b) of FIG. 1 shows the transmission power to be allocated to each discrete frequency in this embodiment. First, transmission powers are determined as in Part (a) of FIG. 1 on the basis of the water filling theorem. Then, information on allocation of the transmission powers thus obtained (e.g. gains with respect to amplitudes in a case without shaping) are sorted into blocks in the frequency direction. For example, in Part (b) of FIG. 1, the blocking is performed on a four-subcarrier basis, and the average value (alternatively, the minimum value, the maximum value, or the like may be used) of the gains in the transmission power allocation is set as a representative value of the corresponding block. Then, the obtained representative values of the blocks are quantized. Part (b) of FIG. 1 is a result of the blocking in the frequency direction and the quantization of the representative values of the blocks into four levels of quantized levels 0 to 3. Setting the transmission powers to be allocated in this way allows a large reduction in the amount of control information necessary for transmission processes. For example, assuming that spectral shaping information is notified as is and that the number of subcarriers is 1024 and the transmission power to be allocated is equal to 8 bits, then 1024×8=8192 bits are necessary. However, if blocking is performed in the frequency direction by 16 subcarriers, and 4-level quantization is performed, then, since the 4-level quantization can be expressed with 2 bits due to $2^2=4$, the necessary number of bits is 1024/16×2=128 bits. As for the quantization, the true values of the gains of the transmission powers to be allocated may be quantized, or the decibel values may be quantized. In addition, although the quantization is done at uniform intervals in Part (b) of FIG. 1, the uniform quantization is not always necessary, and the quantization may be done at mutually different intervals.

Figure 2:
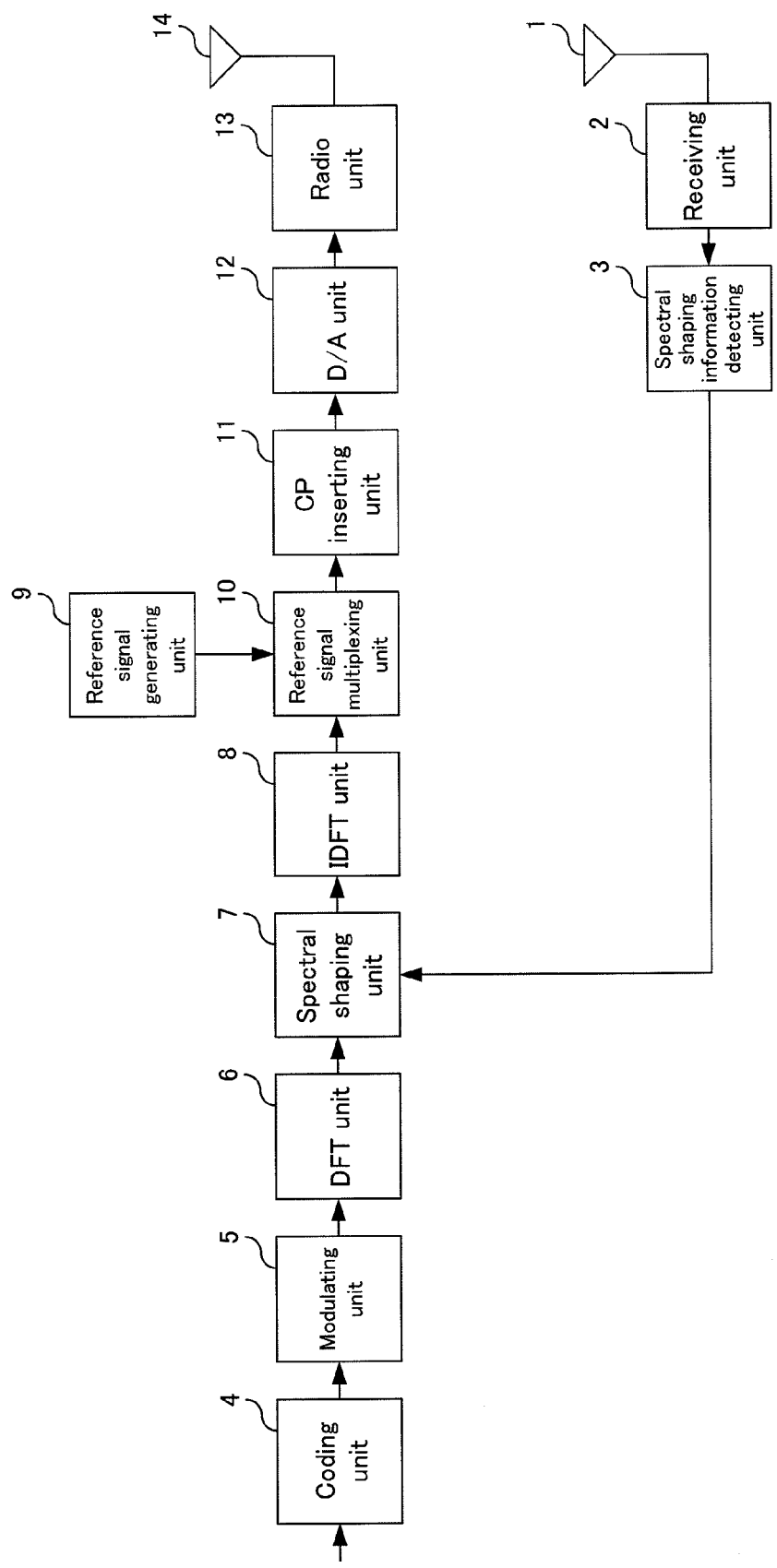
FIG. 2 is a functional block diagram showing one example of the configuration of a mobile station device (a transmitting device, or a communication device configured to be notified of power allocation information and perform spectral shaping) according to the embodiment.

FIG. 2 is a functional block diagram showing one example of the configuration of a mobile station device (a transmitting device, or a communication device configured to be notified of power allocation information and perform spectral shaping) according to this embodiment. The transmitting device shown in FIG. 2 includes a receiving antenna 1, a receiving unit 2, a spectral shaping information detecting unit 3, a coding unit 4, a modulating unit 5, a DFT unit 6, a spectral shaping unit 7, an IDFT (Inverse DFT) unit 8, a reference signal generating unit 9, a reference signal multiplexing unit 10, a CP (Cyclic Prefix) inserting unit 11, a D/A (Digital to Analog) unit 12, a radio unit 13, and a transmitting antenna 14.

A processing flow will be described. A control signal notified by a base station device is first received by the receiving antenna 1, and then control information is detected by the receiving unit 2, and thereafter transmission power allocation information for spectral shaping is detected by the spectral shaping information detecting unit 3.

Meanwhile, an information bit string to be transmitted to the base station device is subjected to error correction coding by the coding unit 4, and then a modulated signal is generated by the modulating unit 5. Then, the modulated signal is converted to a frequency signal by the DFT unit 6, and thereafter spectral shaping is performed by the spectral shaping unit 7 by using the transmission powers to be allocated to their respective discrete frequencies which have been obtained by the spectral shaping information detecting unit 3. The frequency signal having undergone the spectral shaping is converted to a time signal by the IDFT unit 8. Thereafter, a known reference signal for estimating the propagation path characteristics is generated by the reference signal generating unit 9 and is multiplexed with the output of the IDFT unit 8 by the reference signal multiplexing unit 10. A last portion of the waveform of the multiplexed signal is added as a CP to the front of the waveform by the CP inserting unit 11. Thereafter, the transmitting signal is converted to an analog signal by the D/A unit 12, up-converted to a radio frequency by the radio unit 13, and then transmitted from the transmitting antenna 14.

Figure 3:
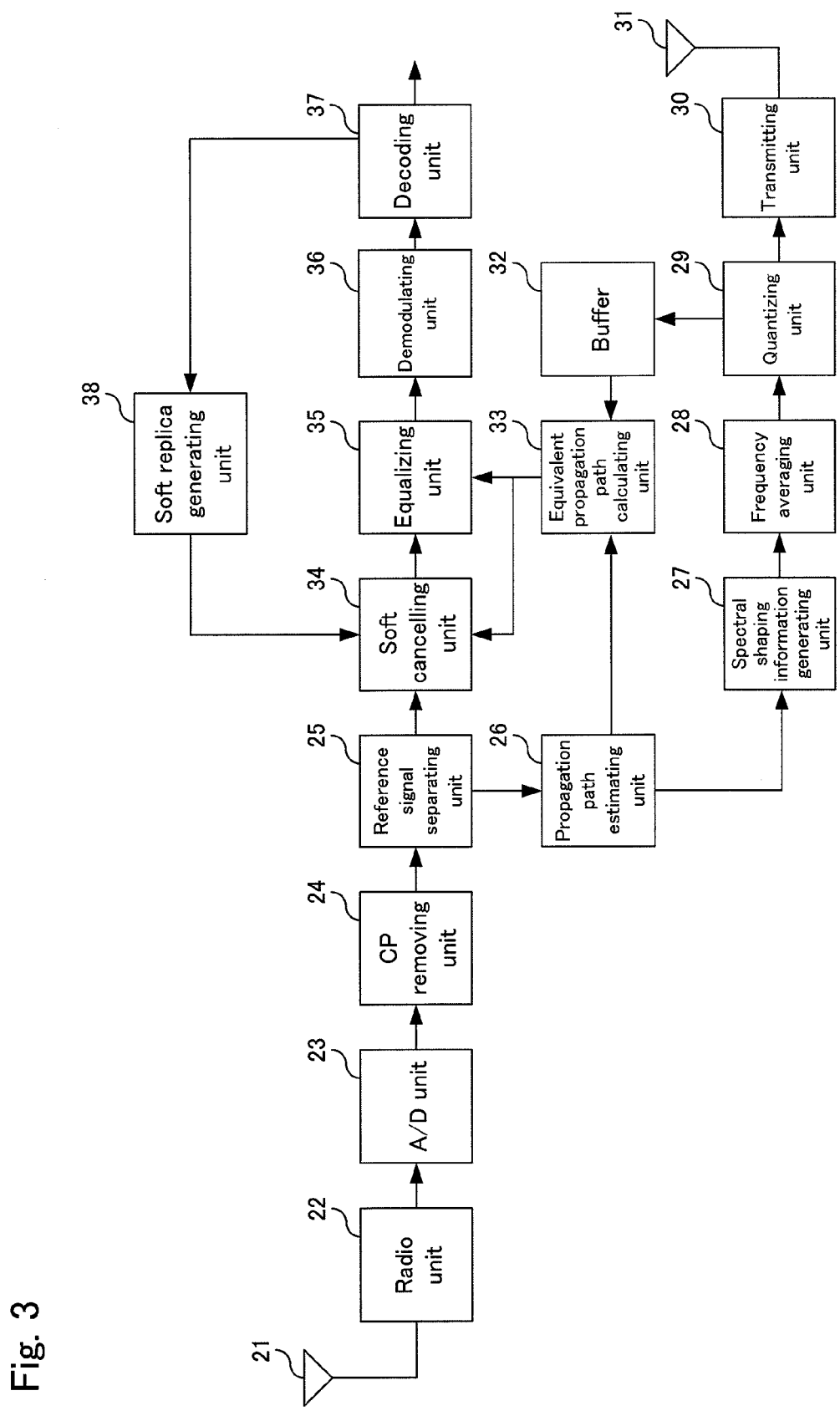
FIG. 3 is a functional block diagram showing one example of the configuration of a base station device (receiving device).

FIG. 3 is a functional block diagram showing one example of the configuration of the base station device (receiving device). The base station device shown in FIG. 3 includes a receiving antenna 21, a radio unit 22, an A/D (Analog to Digital) unit 23, a CP removing unit 24, a reference signal separating unit 25, a propagation path estimating unit 26, a spectral shaping information generating unit 27, a frequency averaging unit 28, a quantizing unit 29, a transmitting unit 30, a transmitting antenna 31, a buffer 32, an equivalent propagation path calculating unit 33, a soft cancelling unit 34, an equalizing unit 35, a demodulating unit 36, a decoding unit 37, and a soft replica generating unit 38.

A processing flow will be described. A received signal is received by the receiving antenna 21 and then down-converted to a baseband by the radio unit 22. Thereafter, the received signal is converted to a digital signal by the A/D unit 23, and then the CP is removed by the CP removing unit 24. Then, the received signal from which the CP has been removed is subjected to separation of the reference signal by the reference signal separating unit 25. The separated reference signal is inputted to the propagation path estimating unit 26 to estimate the frequency characteristics of the propagation path. With the estimated frequency characteristics of the propagation path, transmission power allocation based on the water filling theorem is determined by the spectral shaping information generating unit 27. As mentioned above, the frequency averaging unit 28 performs blocking by multiple subcarriers and calculates the average value of the transmission power gains for each block. Thereafter, the transmission power gains in the blocks are quantized by the quantizing unit 29, converted to a transmitting signal by the transmitting unit 30, and then transmitted to the mobile station device from the transmitting antenna 31.

Meanwhile, the information on the transmission power gains for spectral shaping, which has been obtained by the quantizing unit 29, is stored in the buffer 32 since the information will be used for spectral shaping of the signal to be transmitted in the next transmission event. Thereafter, equivalent propagation path characteristics are calculated by the equivalent propagation path calculating unit 33 by multiplying the frequency characteristics of the propagation path, which are outputted by the propagation path estimating unit 26, by the transmission power gains for the spectral shaping in the last transmission event, which are stored in the buffer 32.

The equivalent propagation path thus obtained is inputted to the soft cancelling unit 34 together with the received signal excluding the reference signal separated by the reference signal separating unit 25 (this received signal will be referred to as a received data signal) and the soft replica generating unit 38 to cancel an intersymbol interference. Thereafter, the signal after the soft cancel is processed such that the received data signal is equalized by the equalizing unit 35 and is decomposed into bit-based log likelihood ratios (LLRs) by the demodulating unit 36. The obtained LLRs are subjected to error correction decoding by the decoding unit 37, and then the LLRs whose reliabilities have been improved are inputted to the soft replica generating unit 38. By the soft replica generating unit 38, a soft replica having amplitude in proportion to the reliabilities obtained from the inputted LLRs is generated and inputted again to the soft cancelling unit 34. For example, given that the modulation scheme is QPSK (Quaternary Phase Shift Keying) and that the LLRs of the bits constituting a QPSK symbol are $\lambda_1$ and $\lambda_2$, respectively, a soft replica $s_{soft}$ is expressed by a formula (1).

[Formula 1]

$$s_{soft} = \frac{1}{\sqrt{2}} \tanh\left(\frac{\lambda_1}{2}\right) + j \frac{1}{\sqrt{2}} \tanh\left(\frac{\lambda_2}{2}\right) \qquad (1)$$

where tan h(x) represents a hyperbolic tangent, and j represents an imaginary unit satisfying $J^2 = -1$. The above processes are repeated predetermined times, and the LLRs of the information bit string finally obtained by the recoding unit 37 are subjected to hard decision to obtain information bits. The present invention can be carried out by the configuration as described above. Although the gain for the transmission power allocation of each block is notified in this embodiment, the difference between the adjacent blocks may be notified instead.

In this embodiment, spectral shaping can be performed with a small amount of control information, and therefore the transmission efficiency is increased.

Second Embodiment

Next, a second embodiment of the present invention will be described. In the first embodiment described above, blocking is performed by multiple subcarriers, the representative values of the blocks are quantized, and the quantized representative values themselves are used as the gains in the transmission power allocation. In this embodiment, however, the quantized gains in the transmission power allocation are regenerated by using supplement through interpolation or extrapolation in the frequency direction, and then the spectral shaping is performed. FIG. 4 is a diagram showing an example of this concept. Part (a) of FIG. 4 is the same diagram as Part (b) of FIG. 2 in which the blocking in the frequency direction and the quantization are done. Further, in this embodiment, as shown in Part (b) of FIG. 4, the representative value of each block is assumed as the gain for the transmission power allocation at the center frequency of the block, and the gain for the transmission power allocation at each discrete frequency is calculated by interpolation between the adjacent blocks or by extrapolation.

For example, as shown in Part (b) of FIG. 4, assume that the number of blocked discrete frequencies is four, the gain for the transmission power allocation in a block k is C(k), and the gain for the transmission power allocation in an adjacent block k+1 is C(k+1). Then, the center frequency of each block is found in between the second and third discrete frequencies, and therefore the third and fourth discrete frequencies C(k,3) and C(k,4) in the block k as well as the first and second discrete frequencies C(k+1,1) and C(k+1,2) in the block k+1 can be calculated. In general, given that m is the number of discrete frequencies included in each block, and C(k,1) is the gain for the transmission power allocation at the 1-th subcarrier in the block k, then the following formulae are available.

[Formula 2]

$$C(k, l) = \frac{C(k+1) - C(k)}{m} \times (l + (k-1)m) + \frac{(3m+1)C(k) - (m+1)C(k-1)}{2m} \left(\frac{m}{2} < l \le m\right) \qquad (2)$$

$$C(k+1, l) = \frac{C(k+1) - C(k)}{m} \times (l + km) + \frac{(3m+1)C(k) - (m+1)C(k-1)}{2m} \left(1 \le l < \frac{m}{2}\right) \qquad (3)$$

The power gain at each discrete frequency is calculated based on the formulae (2) and (3) given above. Note that extrapolation should be performed for the frequencies at both ends in a state where, of the two ends of the frequency band, the lower frequency end is given the formula (2) with 1 having a range of from 1 to m while the higher frequency end is given the formula (3) with 1 having a range of from 1 to m.

Figure 5:
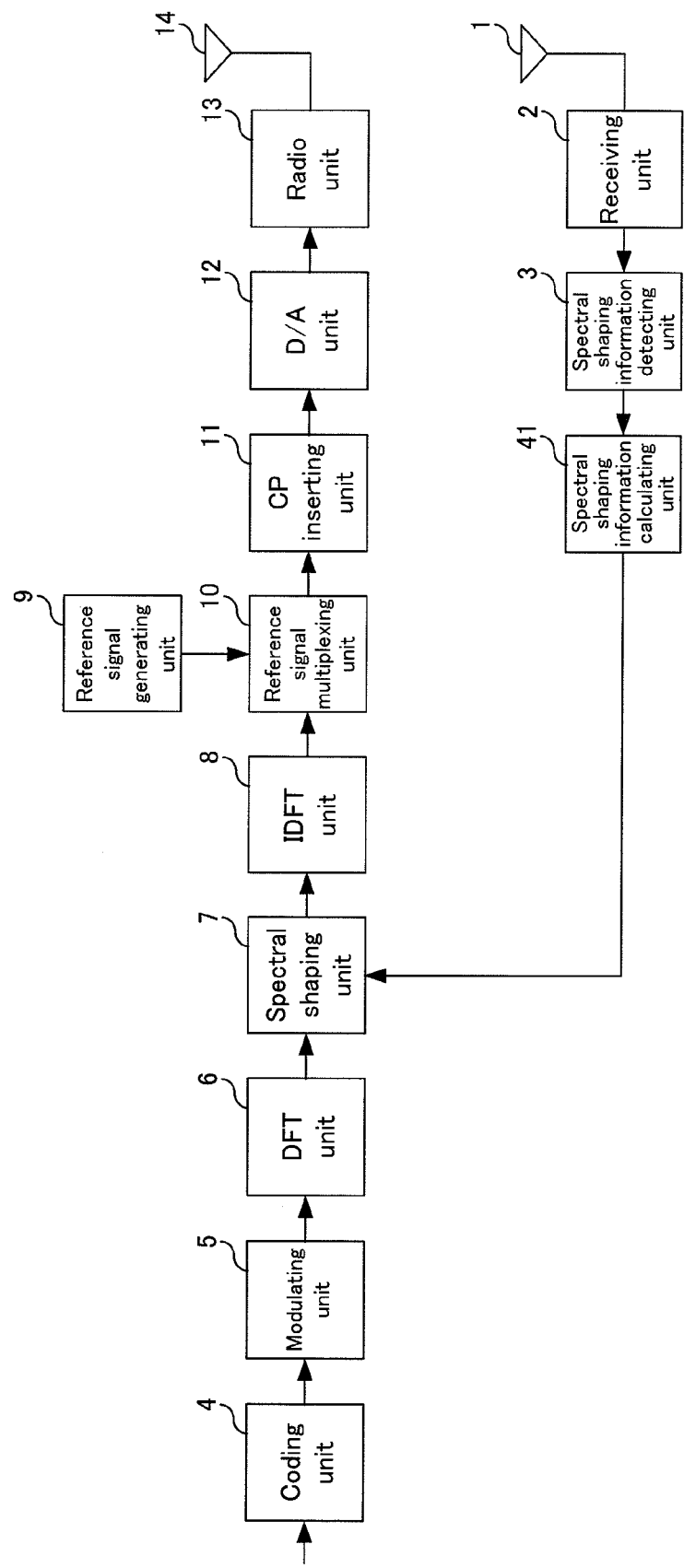
FIG. 5 is a functional block diagram showing one example of the configuration of a mobile station device of a second embodiment of the present invention.

FIG. 5 is a functional block diagram showing one example of the configuration of a mobile station device of this embodiment. In FIG. 5, the blocks representing the functions and means denoted by the same reference numerals in FIG. 2 are the same as those in FIG. 2, and therefore description thereof is omitted. Here, the newly added means is a spectral shaping information calculating unit 41. The spectral shaping information calculating unit 41 calculates the gain of the transmission power to be allocated to each discrete frequency on the basis of the formulae (2) and (3).

Figure 6:
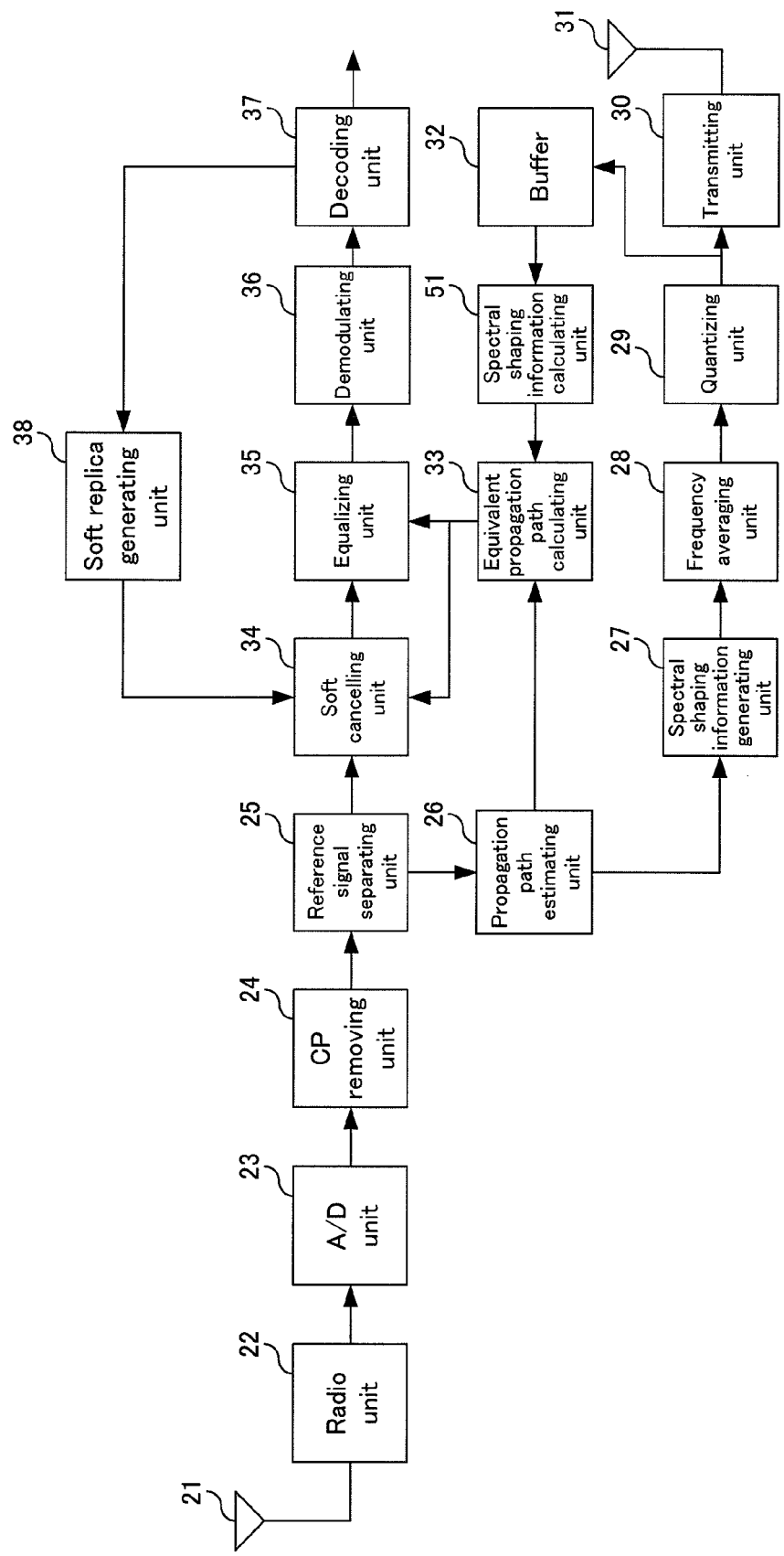
FIG. 6 is a functional block diagram showing one example of the configuration of a base station device of the second embodiment of the present invention.

FIG. 6 shows a functional block diagram showing one example of the configuration of a base station device of this embodiment. Likewise, the blocks representing the functions and means denoted by the same reference numerals in FIG. 3 are the same as those in FIG. 3. Here, the newly added means is a spectral shaping information calculating unit 51. Here as well, like FIG. 5, the spectral shaping information calculating unit 51 calculates the spectral shaping information on the basis of the formulae (2) and (3). By calculating a quantized gain of transmission power for each discrete frequency by interpolation or extrapolation as described above, the transmission characteristics can be further improved. Note that although this embodiment has shown an example where supplement is done using the linear functions, a supplement process using the quadratic functions, the trigonometric functions, or the like may be used, as long as the transmitting and receiving sides use the same supplement method.

Third Embodiment

A third embodiment is a technique that further reduces the amount of the control information by using Huffman coding and the like. For example, there has been disclosed a means in which in a case where multiple users are multiplexed in a frequency domain by using spectral shaping, 50% of each frequency spectrum is clipped (power is not allocated) on condition that the transmitted signals of two mobile stations are subjected to frequency division multiplexing (Okada et al., "A Study on Spectrum Division Multiplexing Technique exploiting Frequency Clipped Spectrum Shaping for Turbo Equalization," 2007, Proceedings of the 2007 IEICE General Conference, B-5-114, March 2007.). It has been found that the half of the frequencies is clipped in this case. As described above, there are cases where the proportions of the levels of the quantized gains are not even (for example, in a case of four-level quantization, level 0 (no allocation): 50%, level 1: 10%, level 2: 10%, and level 3: 30%). In such cases, the number of bits showing the gains to be allocated to the frequencies to be clipped can be reduced. Table 1 shows examples of the bit(s) assigned to the quantization levels in a case of clipping by 50%.

TABLE 1

|  | Bit |
| --- | --- |
| Level 0 (clipping) | 1 |
| Level 1 | 001 |
| Level 2 | 000 |
| Level 3 | 01 |

In Table 1, the level 0 represents clipping, and the higher the level number, the larger the gain. In general, on condition that the total transmission power is fixed and the proportion of the clipping is large, large powers are allocated to the remaining frequencies due to redistribution of transmission powers, and therefore the probability of the level 3 is assumed to be high. However, the present invention is not limited to this assumption, and essentially obtains the same result by allocating a smaller number of bits to a quantization level with a higher probability on the frequency axis and allocating a larger number of bits to a quantization level with a lower probability. In this case, if 1024 subcarriers are sorted into blocks by discrete frequencies at 16 points in the frequency direction, expressing the 4 levels with 2 bits leads to 1024/16×2=128 bits; however, given that level 0: 50%, level 1: 10%, level 2: 10%, and level 3: 30%, using the method shown in Table 1 leads to 1×1024/16×0.5+2×1024/16×0.3+3×1024/16×0.1+3×1024/16×0.1=108.8. Thus, the number of bits necessary for the notification can be further reduced. Meanwhile, to describe a method of distinguishing the symbols, a bit(s) can be identified as next information if appearing after 1 appears or after 0 appears three times continuously, as can be seen from Table 1, and therefore the bit(s) assigned to each block does not particularly need to be notified. These symbols are called Huffman codes, and using information source coding method based on a similar idea will lead to essentially the same result.

Figure 7:
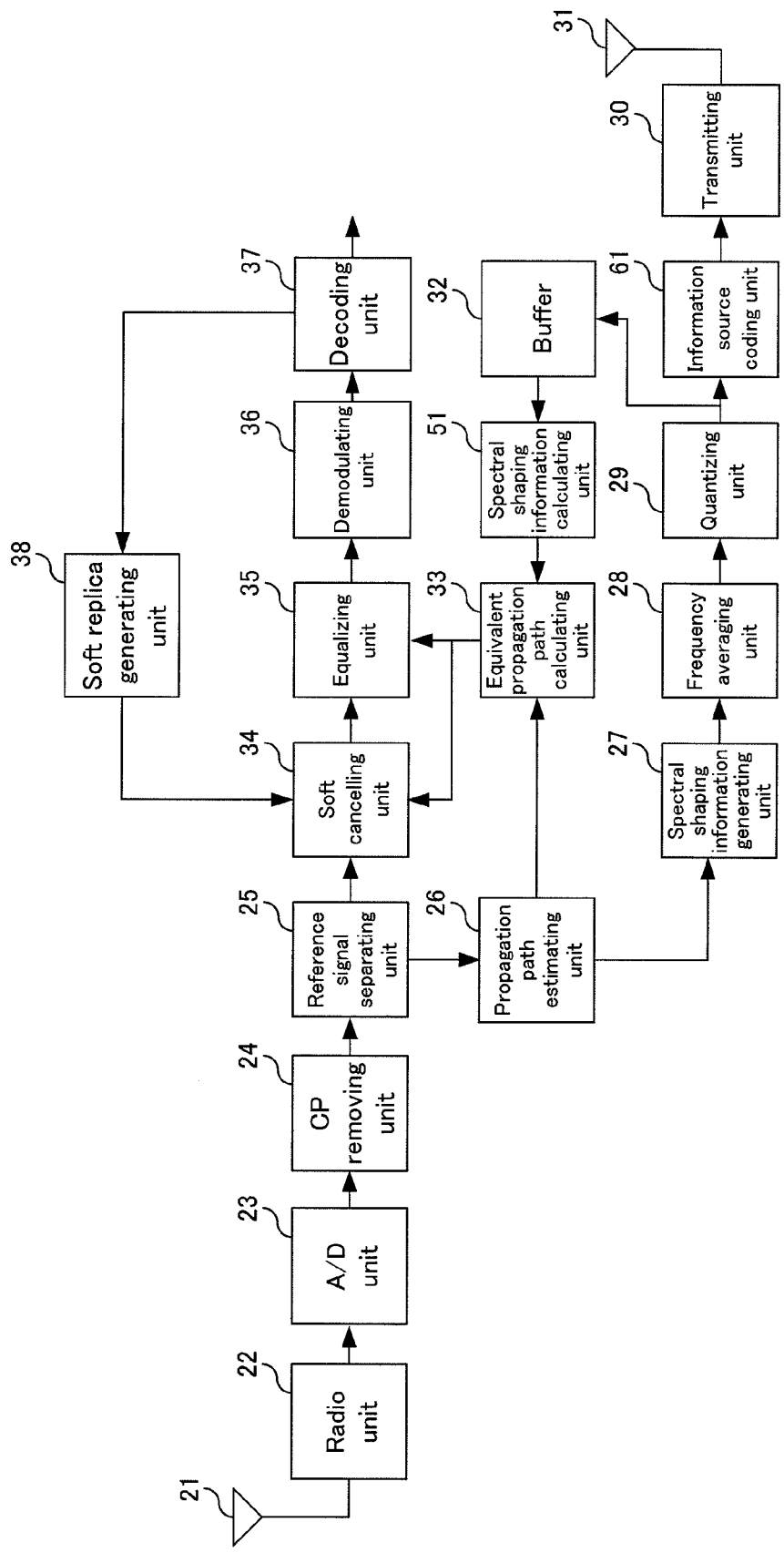
FIG. 7 is a functional block diagram showing one example of the configuration of a mobile station device of a third embodiment of the present invention.

FIG. 7 is a functional block diagram showing one example of the configuration of a base station device of this embodiment. The blocks representing the functions and means denoted by the same reference numerals in FIG. 5 are the same as those in FIG. 5, and therefore description thereof is omitted. FIG. 7 differs from FIG. 5 in that a Huffman coding unit 61 is provided after where the quantization is performed. The information on the quantized gains for the transmission powers to be allocated, which are obtained by the quantizing unit 29, is subjected to the Huffman coding and transmitted through the transmitting unit 30. Meanwhile, it is clear that decoding is performed on the Huffman coding by the receiving unit 2 (FIGS. 2 and 5) in the mobile station device, although this is not illustrated.

Using the technique of this embodiment as described above makes it possible to further reduce the amount of the control information and perform single-carrier transmission using spectral shaping. Note that although the above embodiment is based on single carrier, the present invention can also be applied to a multi-carrier method (such as OFDM) in which transmission is performed while independently modulating subcarriers. Moreover, the third embodiment can be combined with the second embodiment, as a matter of course.

Fourth Embodiment

A method in which only clipped frequencies are notified will be described as a fourth embodiment. This corresponds to a case where the quantization is performed at two levels in the first embodiment. In this case, frequency blocks are notified with "0" assigned to clipped frequencies and "1" assigned to frequencies to which signal powers are allocated. Thus, if 1024 subcarriers are sorted into blocks by discrete frequencies at 16 points in the frequency direction, information of only 1024/16=64 bits is required. Here, in a case where the receiving and transmitting sides figure out only the clipped frequencies as in this embodiment, this embodiment can be implemented by causing the spectral shaping information calculating units 41 and 51 in FIGS. 5 and 6 to redistribute the powers of the clipped frequencies to the spectra of the unclipped frequencies. The transmitter and receiver devices are the same as those in FIGS. 5 and 6, and the process mentioned above is performed in their spectral shaping information calculating units. By the process described above, the amount of the control information can be reduced.

A program for implementing the functions described in each of the embodiments may be recorded in a computer-readable recording medium, and a computer system may be caused to read and execute the program recorded in the recording medium to perform the process of each unit. Note that the "computer system" mentioned here includes an OS and hardware such as a peripheral device.

Moreover, the "computer system" is also one including a website providing environment (or displaying environment) if utilizing a WWW system.

Moreover, the "computer-readable recording medium" refers to a portable medium such as a flexible disk, a magneto-optical drive, a ROM, or a CD-ROM, or a storage incorporated in the computer system such as a hard disk. Further, the "computer-readable recording medium" is also one including one configured to dynamically hold a program for a short period of time such as a communication line used when a programs is transmitted through such a network as the Internet or through such a communication channel as a telephone channel, and also one including one configured to hold the program for a certain length of time such as a volatile memory inside a server or a client computer system used in this case. Moreover, the program may be one for implementing part of the functions mentioned above, and further one capable of implementing the functions in combination with a program already recorded in the computer system.

Moreover, programs running in the mobile station device and the base station device according to the present invention are programs configured to control their CPUs and the like in such a way as to implement the functions of each of the embodiments according to the present invention (programs configured to cause the computers to function). Further, information handled by these devices is accumulated temporarily in RAMs when processed, then stored in ROMs or HDDs of various types, and thereafter read, corrected, and/or written by the CPUs as needed. The recording medium to store the programs may be a semiconductor medium (such as a ROM or a non-volatile memory card, for example), an optical recording medium (such as a DVD, a MO, a MD, a CD, or a BD, for example), a magnetic recording medium (such as a magnetic tape or a flexible disk, for example), or the like. Moreover, not only may the above-mentioned functions of each of the embodiments be implemented by executing the loaded programs, but the functions of the present invention may also be implemented by performing processes on the basis of instructions from the programs in cooperation with the operating system, some other application programs, or the like.

In addition, in a case of distributing the present invention to the market, the programs stored in the portable recording medium may be distributed, the programs may be transferred to a server computer connected to a network such as the Internet, and so on. In this case, the present invention includes a storage in the server computer. Each of the mobile station device and the base station device in the above-described embodiments may be implemented partly or entirely as an LSI being typically an integrated circuit. The functional blocks in each of the mobile station device and the base station device may be formed as individual chips or partly or entirely integrated into a chip. Moreover, the method of forming an integrated circuit is not limited to LSI, and may be achieved with an exclusive circuit or a versatile processor. Furthermore, upon the rise of a circuit integration technique that takes the place of LSI with advancement in the semiconductor technology, an integrated circuit manufactured by such a technique can be used as well.

Although embodiments of the invention have been described above in detail with reference to the drawings, specific configurations are not limited to those in the embodiments. The claims include designs and the like without departing from the gist of the invention.

INDUSTRIAL APPLICABILITY

The present invention is suitably used in, but not limited to, mobile communication systems in which mobile phone devices are mobile station devices.

The invention claimed is:

1. A wireless communication system including a first communication device configured to perform spectral shaping on a frequency signal and transmit the signal, and a second communication device configured to receive the signal transmitted by the first communication device, characterized in that
the second communication device includes
a frequency averaging unit configured to divide information on transmission power gains in all the discrete frequencies into blocks by a plurality of discrete frequencies, information being necessary for the first communication device to perform the spectral shaping,
a quantizing unit configured to quantize representative values of the blocks, and
a transmitting unit configured to transmit the quantized signals generated from the quantized representative values of the blocks.

2. The wireless communication system according to claim 1, characterized in that each of the first communication device and the second communication device further calculates gains of transmission powers to be allocated to the discrete frequencies by using at least one of interpolation and extrapolation.

3. The wireless communication system according to claim 1, characterized in that in a source coding process of the quantized gains of the transmission powers, the second communication device assigns a smaller number of information bits to a level with a higher probability while assigning a larger number of information bits to a level with a lower probability.

4. The wireless communication system according to claim 3, characterized in that the source coding process assigns a small number of information bits to a clipped frequency.

5. A second communication device in a wireless communication system including a first communication device configured to perform spectral shaping on a frequency signal and transmit the signal, and the second communication device configured to receive the signal transmitted by the first communication device, characterized in that
the second communication device comprises
a frequency averaging unit configured to divide information on transmission power gains in all the discrete frequencies into blocks by a plurality of discrete frequencies, information being necessary for the first communication device to perform the spectral shaping,
a quantizing unit configured to quantize representative values of the blocks, and
a transmitting unit configured to transmit the quantized signals generated from the quantized representative values of the blocks.

6. The second communication device according to claim 5, characterized in that each of the first communication device and the second communication device further calculates gains of transmission powers to be allocated to the discrete frequencies by using at least one of interpolation and extrapolation.

7. The second communication device according to claim 5, characterized in that in a source coding process of the quantized gains of the transmission powers, the second communication device assigns a smaller number of information bits to a level with a higher probability while assigning a larger number of information bits to a level with a lower probability.

8. The second communication device according to claim 7, characterized in that the source coding process assigns a small number of information bits to a clipped frequency.

9. A communication method of a second communication device in a wireless communication system including a first communication device configured to perform spectral shaping on a frequency signal and transmit the signal, and the second communication device configured to receive the signal transmitted by the first communication device, characterized in that
the communication method comprises:
a frequency averaging step of dividing information on transmission power gains in all the discrete frequencies into blocks by a plurality of discrete frequencies, information being necessary for the first communication device to perform the spectral shaping;
a quantizing step of quantizing representative values of the blocks; and
a transmitting step of transmitting the quantized signals, generated from the quantized representative values of the blocks, to the first communication device.

10. A program configured to execute the communication method according to claim 9.

11. The wireless communication system according to claim 2, characterized in that in a source coding process of the quantized gains of the transmission powers, the second communication device assigns a smaller number of information bits to a level with a higher probability while assigning a larger number of information bits to a level with a lower probability.

12. The second communication device according to claim 6, characterized in that in a source coding process of the quantized gains of the transmission powers, the second communication device assigns a smaller number of information bits to a level with a higher probability while assigning a larger number of information bits to a level with a lower probability.

* * * * *